United States Patent [19]

Shinmi et al.

[11] 4,144,222
[45] Mar. 13, 1979

[54] THERMOSETTING SILICONE RESIN MOLDING COMPOSITION

[75] Inventors: Hideo Shinmi, Ichihara; Tsuneo Hanada, Chiba, both of Japan

[73] Assignee: Toray Silicone Company, Ltd., Tokyo, Japan

[21] Appl. No.: 820,024

[22] Filed: Jul. 28, 1977

[30] Foreign Application Priority Data

Sep. 7, 1976 [JP] Japan .......................... 51-106239

[51] Int. Cl.$^2$ ............................................. C08L 83/04
[52] U.S. Cl. ................................. 260/37 SB; 260/825; 264/331; 264/329; 528/18; 528/31; 528/33; 528/36; 528/43; 260/18 S; 260/28 R; 260/29.1 SB
[58] Field of Search ............. 260/46.5 R, 825, 46.5 G, 260/37 SB

[56] References Cited

U.S. PATENT DOCUMENTS

| 2,833,732 | 5/1968 | Weyer | 260/2.5 |
|---|---|---|---|
| 3,127,363 | 3/1964 | Nitzsche et al. | 260/18 |
| 3,208,961 | 9/1965 | Kookootsedes | 260/18 |
| 3,560,244 | 2/1971 | Neuroth | 260/46.5 G |
| 3,627,729 | 12/1971 | Trego | 260/46.5 R |
| 3,839,280 | 10/1974 | Zdaniewski | 260/46.5 R |
| 3,867,343 | 2/1975 | Garden | 260/46.5 G |

Primary Examiner—Melvyn I. Marquis
Attorney, Agent, or Firm—Haseltine, Lake & Waters

[57] ABSTRACT

An improved thermosetting silicone resin molding composition characterized by consisting essentially of 100 parts by weight of organopolysiloxane resin having organic radical: Si ratio of 1.0:1 to 1.7:1 and containing at least 0.2% by weight of silicon-bonded hydroxyl groups, organohydrogenpolysiloxane containing at least one silicon bonded hydrogen atom in each molecule thereof, said organohydrogenpolysiloxane being in such an amount that the number of the hydrogen atoms per hydroxyl group in said organopolysiloxane is between 0.001 and 0.30, 0.01 to 15 parts by weight of organotin oxide, and 50 to 700 parts by weight of an inorganic filler.

8 Claims, No Drawings

THERMOSETTING SILICONE RESIN MOLDING COMPOSITION

BACKGROUND OF THE INVENTION

The present invention relates to thermosetting silicone resin molding compositions, and more particularly the invention relates to a silicone resin molding composition which is capable of being thermoset at lower temperatures with a reduced time.

Silicone resins have excellent heat resistance, water resistance and electrical properties, and therefore they are now in use in many applications. One of the products obtainable is an insulator for electronic and electrical devices, which is produced by the resin with a filler and catalyst and molding the material into the product.

Since silicone resins used for such molding are generally solid resins that are hard and brittle at room temperature, in order that the resin may be uniformly mixed with a catalyst and filler, it is necessary to heat the resin to a temperature higher than its softening point (50° to 120° C.). During this heating and mixing, if the catalyst acts thus promoting the curing of the resin, this curing tends to impede a smooth molding of the mixed composition. In extreme cases, the curing even tends to make the molding difficult. As a result, the catalyst incorporated in the resin composition must be such that it exhibits no catalytic activity or its catalytic activity is negligible during heating and mixing of the materials but it rapidly activates in the hot fluid state during the molding process.

The catalysts known in the art include lead monoxide, lead oxide and lead carbonate, but these catalysts are disadvantageous in that while, when used singly, these catalysts exhibit weak catalytic activity and do not cause any cure reaction during heating and mixing, the curing during the molding operation cannot be completed within a short period of time. As a means of overcoming these deficiencies, the use of a carboxylic acid, ammonium salt of a carboxylic acid, carboxylic anhydride or the like in combination with such known catalyst has been proposed in U.S. Pat. No. 3,208,961 specification, for example. This method is also disadvantageous in that while the curing can be completed within a short period of time, cure reaction is caused during the heating and mixing thus setting a limit to the available kneading time. Another disadvantage is that a high molding temperature of 170° to 180° C. is usually required, and consequently if the resin is used as an encapsulation material for electronic parts which are susceptible to temperature, there will be a detrimental effect on the encapsulated parts. Still another disadvantage is that since the content of electrolyte impurities in the molding composition is high, the use of the resin on parts for electronic equipment involves difficulty, and moreover the use of a lead compound has the possibility of causing environmental pollution or harm to the human body.

SUMMARY OF THE INVENTION

It is an object of the invention to provide a thermosetting silicone resin molding composition which incorporates a less toxic catalyst, is highly stable during heating and mixing, is readily kneadable and is moldable within a short period of time at low temperature.

It is another object of the invention to provide a thermosetting silicone resin composition which is capable of producing articles which have dimensional stability during a heating treatment after the molding.

The thermosetting silicone resin molding composition according to the invention features the following main constituent components (a) to (d).

(a) 100 parts by weight of organopolysiloxane having the R/Si ratio of 1.0 to 1.7, R being substituted or unsubstituted univalent hydrocarbon radicals bonded to silicon atoms, and at least 0.2% by weight content of silicon-bonded hydroxyl groups.

(b) Organohydrogenpolysiloxane having in each molecule thereof at least one silicon-bonded hydrogen atom, the amount of said organohydrogenpolysiloxane being such that the number of the silicon-bonded hydrogen atoms per silicon-bonded hydroxyl group in the organopolysiloxane resin of (a) is between 0.001 and 0.30.

(c) 0.01 to 15 parts by weight of organotin oxide (where the organic group is a substituted or unsubstituted univalent hydrocarbon group).

(d) 50 to 700 parts by weight of an inorganic filler.

In this specification, the organopolysiloxane resin of (a), the organohydrogenpolysiloxane of (b), the organotin oxide of (c) and the inorganic filler of (d) will now be simply referred respectively to a component (a), component (b), component (c) and component (d).

DETAILED DESCRIPTION OF THE INVENTION

The inventors, etc., have made ardent studies in order to overcome the foregoing deficiencies in the prior art, and have discovered that although organotin oxides can exhibit only weak catalytic activity in the condensation reaction of organopolysiloxane resin containing silicon-bonded hydroxyl groups, if organotin oxide is used in combination with a small amount of organohydrogenpolysiloxane containing in each molecule thereof at least one silicon-bonded hydrogen atom, the reaction will be promoted greatly and the combined use of such organotin oxide and organohydrogenpolysiloxane can produce a synergistic effect.

In preparing the composition of this invention, the component (a) or organopolysiloxane may comprise any of the known materials, and exemplary siloxane units usable to provide such siloxane resin include $CH_3SiO_{1.5}$, $C_2H_5SiO_{1.5}$, $C_6H_5SiO_{1.5}$, $CH_2{=}CHSiO_{1.5}$, $CH_2{=}CHCH_2SiO_{1.5}$, $C_3H_7SiO_{1.5}$, $Cl_2C_6H_3SiO_{1.5}$, $CF_3CH_2CH_2CH_2SiO_{1.5}$, etc. And so far as the R/Si ratio is within the range of 1.0 to 1.7, the component may contain such exemplary constituent unit as $(CH_3)_2SiO$, $(C_2H_5)_2SiO$, $(C_6H_5)_2SiO$, $CH_3(CH_2{=}CH)SiO$, $CH_3(C_6H_5)SiO$, $C_6H_5(CH_2{=}CH)SiO$, $C_6H_5(C_2H_5)SiO$, $CH_3(CF_3CH_2CH_2CH_2)SiO$ or the like as well as such exemplary constituent unit as $(CH_3)_3SiO_{0.5}$, $(CH_3)_2(C_6H_5)SiO_{0.5}$, $(CH_3)(C_6H_5)_2SiO_{0.5}$, $(C_6H_5)_3SiO_{0.5}$, $(CH_3)_2(CH_2{=}CH)SiO_{0.5}$, $(CH_3)(CH_2{=}CH)(C_6H_5)SiO_{0.5}$, $SiO_{4/2}$ or the like. The component may further comprise such alkoxy group or groups as methoxy group, ethoxy group, propoxy group, butoxy group, etc., bonded to silicon atoms.

By selecting and blending the organohalosilane or organoalkoxysilane in such a manner that the resulting R/Si ratio is in the range between 1.0 to 1.7 and then subjecting to hydrolysis and condensation reaction under adequate conditions, the organopolysilane is obtained with such constituent units as mentioned previously, including a certain amount of silicon-bonded hydroxyl groups. If the content of silicon-bonded hydroxyl groups is excessively small, insufficient cure will result, and therefore the component (a) must contain at least 0.2% by weight of such hydroxyl groups. The type of organopolysiloxane resin used need not be limited to only one kind, and two or more kinds of resins may be mixed and used.

There is no limitation to the structure of the component (b) or organohydrogenpolysiloxane used in this invention provided that the component contains in each molecule thereof at least one silicon-bonded hydrogen atom, and therefore it is possible to use any known type of organohydrogenpolysiloxane of the straight-chain structure, cyclic structure, branched chain structure or three-dimensional structure.

It is only necessary for this organohydrogenpolysiloxane to include in each molecule thereof at least two siloxane units, and exemplary organic radicals bonded to silicon atoms include substituted or unsubstituted univalent hydrocarbon groups, such as, alkyl group, e.g., methyl, ethyl and propyl groups, alkenyl group, e.g., vinyl and aryl groups, phenyl group, etc.

The amount of the component (b) used in the invention is selected in such a manner that the number of the hydrogen atoms bonded to the silicon atoms in the component (b) is in the range 0.001 to 0.3, preferably in the range between 0.01 and 0.10 per hydroxyl group bonded to the silicon atom in the component (a). If this range is ensured, only one kind of or two or more kinds of organohydrogenpolysiloxanes may be used.

If the amount of the component (b) used is such that the number of the hydrogen atoms in the component (b) is less than 0.001 per hydroxyl group in the component (a), dehydration between the silicon-bonded hydroxyl groups cannot be promoted, whereas if the amount of the component (b) is such that the number of such hydrogen atoms is over 0.3 per hydroxyl group, dehydrogenation takes place in addition to dehydration, thus causing bubbles, bulging and blisters in the molded products.

It should be noted that although the organotin oxide catalyst can exhibit only weak catalytic activity in the dehydration-condensation reaction between the silicon-bonded hydroxyl groups, it can produce excellent catalytic effect in the presence of organohydrogenpolysiloxane. By suitably selecting the kind and amount of organohydrogenpolysiloxanes, the molding time can be determined as desired within the range of 1 to 5 minutes at a molding temperature in the range between 130° and 200° C.

In preparing the component (c) or organotin oxide used in the invention, such exemplary materials as monomethyltin oxide, monoethyltin oxide, monopropyltin oxide, monobutyltin oxide, monooctyltin oxide, monophenyltin oxide, dimethyltin oxide, diethyltin oxide, dibutyltin oxide, diocthyltin oxide, diphenyltin oxide, bis (tri-butyltin) oxide, bis (tri-propyltin) oxide, bis (tri-phenyltin) oxide, tributyltin hydroxide, triphenyltin hydroxide and the like. Especially preferred material is monoalkyltin oxide. Monoalkyltin oxide is also named stannoic acid. According to Chem. Rev. 60,459 (1960), it is regarded as a polymer containing the bond of —Sn—O—Sn— and shown generally by the rational formula, $(RSnOOH)_n$, which can be prepared by hydrolysis of $RSnX_3$ (R is an alkyl group and X is a halogen atom). And according to J. Chem. Soc. Japan Ind. Chem. Sect. 73,2429 (1970), it is a polymer which possesses a constitution unit as shown in [I] and constitution units as shown in [II] and [III] are also mixed in the skeleton of [I] and it is assumed to adsorb a very small amount of water.

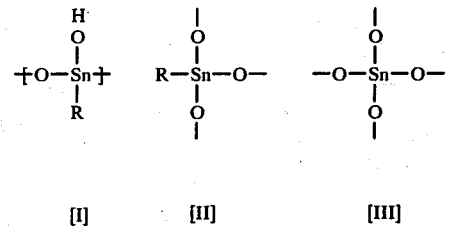

[I]    [II]    [III]

Therefore, in all kinds of references, the general formula of monoalkyltin oxide has been described as

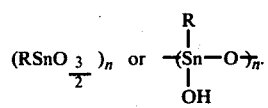

The amount of organotin oxide used is dependent on the kind and amount of the component (b) used, and the amount should be 0.01 to 15 parts by weight, preferably 0.5 to 7 parts by weight per 100 parts by weight of the component (a).

Exemplary materials for the component (d) or inorganic filler used in the invention include glass fiber, glass bead, asbestos, clay, talc, whiskers, wollastonite, diatomaceous earth, ground quartz, molten silica, fumed silica, precipitated silica, titanium oxide, aluminum silicate, zirconium silicate, glass balloon, calcium carbonate, hydrated alumina and the like.

The amount of the inorganic filler used depends on the application of the finished articles, and the amount should be in the range between 50 to 700 parts by weight, preferably in the range 100 to 500 parts by weight per 100 parts by weight of the component (a).

The composition according to the invention may contain, if necessary, a mold releasing agent such as calcium stearate, zinc stearate, aluminum stearate, carnauba wax or silicone oil, a pigment such as iron oxide or carbon black, and other stabilizing agent.

The thermosetting silicone resin molding composition according to the invention is prepared by heating and kneading the above-mentioned components by means of a roll mill, Henschel mixer, kneader mixer, extruder or the like, and there is no requirement for the sequence in which these components are mixed. Although dependent on the amount of the components, the heat kneading can be carried out by a suitable kneading machine within about 5 minutes at a temperature between 70° to 100° C., and there is almost no possibility of condensation occurring during the time. After the completion of the heat kneading, the mixture is cooled into a solid state and it is then ground by a grinder or the like into a molding material.

For molding, any suitable transfer molding machine, compression molding machine, injection molding machine, continuous extruding machine, etc., may be employed as the case may be. Although the molding temperature and time are of course dependent on the type of resins used, the molding can be satisfactorily accomplished within 1 to 3 minutes at temperatures between 120° and 150° C., namely, the molding can be effected at low temperatures as compared with the conventional ordinary molding materials, and the molding time is also shorter.

The molded products are generally subjected to heat treatment after the molding process, and in the case of the conventional ordinary molded products the degree of shrinkage due to heat treatment after the molding process is in the range 0.3 to 0.4%, whereas in the case of the products obtained with the composition of this invention the shrinkage is in most cases less than 0.3%, and the dimensional change before and after the heat treatment is also reduced. Further, by virtue of the fact that the composition of this invention contains no lead catalyst, there is no danger of causing any environmental pollution and harm to the human body.

DESCRIPTION OF THE PREFERRED EMBODIMENTS

The present invention will now be described in greater detail with reference to the following examples. In the following examples, the parts and percentages indicate parts by weight and percentages by weight.

EXAMPLE 1

In this example, 100 parts of solid phenylmethylsiloxane resin having the ratio of 0.6:1 between phenyl groups and silicon atoms and the ratio of 0.5:1 between methyl groups and silicon atoms and containing 6% of silicon-bonded hydroxyl groups, 1.5 parts of straight-chain methylhydrogenpolysiloxane containing 1.5% of hydroxyl groups bonded to silicon atoms (this hydrogen polysiloxane contains 30 silicon-bonded hydrogen atoms in each molecule) and having a viscosity of 30 centistokes at 25° C., 3 parts of pulverized monobutyltin oxide, 200 parts of molten silica passable by over 99% through a 325-mesh screen, 100 parts of glass fiber having an average length of about 1.6 mm and 1 part of calcium stearate were completely kneaded in a two-roll kneader at about 90° C., shaped into a sheet form, cooled and then ground, thus producing a molding material. In this molding material (the composition of this invention), the number of the silicon-bonded hydrogen atoms in the component (b) was 0.064 per silicon-bonded hydroxyl group in the component (a). This molding material had a spiral flow length of 81 cm at 175° C. (this was measured with the Hull measuring instrument according to the EMMI 1-66 method), thus showing that the material possessed a sufficient fluidity as a transfer molding material.

To understand the degree of cure of this composition, the hot hardness was measured in the following manner. The composition was transfer molded at molding temperatures 130°, 150° and 175° C., respectively, with a molding pressure of 63 kg/cm² for different molding times, and at the expiration of 10 seconds from the moment of releasing the molding pressure the Barcol Impressor number of each molded product was measured with the Barcol Impressor (GYZJ 935) according to the ASTMD-2583-67 measuring method.

The measurement results are shown in the following Table 1.

Table 1.

| Molding time (min.) | Molding temperature (° C) | | |
|---|---|---|---|
| | 130 | 150 | 175 |
| 1 | 0 | 30 | 53 |
| 2 | 45 | 60 | 65 |
| 3 | 56 | 65 | 66 |
| 4 | 65 | 66 | 66 |
| 5 | 66 | 66 | 66 |

As will be seen from Table 1, the composition was satisfactorily moldable at a low molding temperature of 130° C., and the molded products were very hard and lustrous, had no bubbles, stains, spots, cracks, blisters, etc., and were excellent in external appearance and quality.

COMPARATIVE EXAMPLE 1

In this example, a molding material was prepared in the same manner as the Example 1 except that methylhydrogenpolysiloxane was not added.

The spiral flow length of this composition, measured at 175° C. according to the EMMI 1-66 method, was 89 cm.

The hot Barcol Impressor numbers of the products produced by transfer molding for 5 minutes at 175° C. with a molding pressure of 63 kg/cm² were in the range of between 0 and 10, and the products were undercured.

COMPARATIVE EXAMPLE 2

A molding material was prepared in the same manner as the Example 1 excepting the addition of 8 parts of straight-chain methylhydrogenpolysiloxane (this meant that there were 0.34 silicon-bonded hydrogen atoms per silicon-bonded hydroxyl group).

The spiral flow length of this material, measured at 175° C. according to the EMMI 1-66 method, was 81 cm.

This molding material was transfer molded for 3 minutes with a molding pressure of 63 kg/cm² at 175° C., and although the molded products were hard, they had blisters and bubbles as well as cracks on the sides.

COMPARATIVE EXAMPLE 3

The hot hardness of a commercial thermosetting silicone molding resin composition (the composition did not contain methylhydrogenpolysiloxane and contained lead carbonate and carboxylic acid in place of organotin oxide as catalysts), was measured in the same manner as the Example 1.

The measurement results are shown in Table 2, and it will be seen from Table 2 that the molding temperature must be higher than 175° C.

Table 2.

| Molding time (min.) | Molding temperature (° C) | | | |
|---|---|---|---|---|
| | 130 | 150 | 160 | 175 |
| 1 | 0 | 0 | 0 | 0 |
| 2 | 0 | 0 | 0 | 40 |
| 3 | 0 | 0 | 35 | 55 |
| 4 | 0 | 20 | 48 | 60 |
| 5 | 0 | 40 | 52 | 65 |

EXAMPLE 2

100 parts of the same phenylmethylpolysiloxane as in Example 1, 4 parts of straight-chain methylhydrogenpolysiloxane containing 0.4% of silicon-bonded hydrogen atoms (this hydrogen polysiloxane contains 8 silicon-bonded hydrogen in each molecule) and having a viscosity of 6 centistokes at 25° C., 3 parts of monobutyltin oxide, 200 parts of molten silica, 100 parts of glass fiber of 1.6 mm length, and 1 part of calcium stearate were mixed in the same manner as the Example 1, thus producing a molding material. In this molding material, the number of the silicon-bonded hydrogen atoms in the component (b) per silicon-bonded hydroxyl group in the component (a) was 0.045.

The EMMI spiral flow length of this molding material at 175° C. was 89 cm.

The following Table 3 shows the hot Barcol Impressor numbers measured in the same manner as the Example 1.

It will thus be seen that the curing speed of the molding material can be adjusted by suitably selecting the type of methylhydrogenpolysiloxanes.

Table 3.

| Molding time (min.) | Molding temperature (° C) | | |
|---|---|---|---|
| | 130 | 150 | 175 |
| 1 | 0 | 0 | 0 |
| 2 | 0 | 0 | 15 |
| 3 | 0 | 0 | 45 |
| 4 | 0 | 20 | 52 |
| 5 | 0 | 40 | 56 |

EXAMPLE 3

100 parts of solid phenylmethylsiloxane having the ratio of 0.60:1 between the number of phenyl groups and silicon atoms and the ratio of 0.72:1 between the number of methyl groups and silicon atoms and containing 3.5% of silicon-bonded hydroxyl groups, 2 parts of copolymer of straight-chain methylhydrogensiloxane and dimethylsiloxane containing 1.0% of silicon-bonded hydrogen atoms (this hydrogen polysiloxane contains 20 hydrogen atoms in each molecule) and having a viscosity of 100 centistokes at 25° C., 1.5 parts of monomethyltin oxide, 95 parts of molten silica passable by over 99% through a 325-mesh screen, 200 parts of glass fiber having an average length of about 1.6 mm, and 1 part of zinc stearate were mixed in the same manner as in Example 1, thus preparing a molding material. In this molding material, the number of the silicon-bonded hydrogen atoms in the component (b) per silicon-bonded hydroxyl group in the composition (a) was 0.097.

The EMMI spiral flow length of this molding material at 175° C. was 64 cm.

The molding material was transfer molded for 3 minutes at 150° C. with a molding pressure of 63 kg/cm$^2$.

When measured at the expiration of 10 seconds from the moment of releasing the molding pressure, the Barcol Impressor number of the molded products was 65.

The thusly obtained molded products were very hard and lustrous, had no bubbles, stains, spots, cracks, blisters, etc., and were excellent in external appearance and quality.

EXAMPLE 4

In this example, a molding material was prepared by mixing, in the same manner as the Example 1, 100 parts of solid phenylmethylsiloxane resin having the ratio of 0.4:1 between the numbers of phenyl groups and silicon atoms and the ratio of 1.1:1 between the number of methyl groups and silicon atoms and containing 4% of silicon-bonded hydroxyl groups, 1.4 parts of cyclicmethylhydrogen polysiloxane containing 1.67% of silicon-bonded hydrogen atoms (corresponding to 33 silicon-bonded hydrogen atoms in each molecule), 4 parts of monophenyltin oxide, and 300 parts of ground quartz filler. In this molding material, the number of the silicon-bonded hydrogen atoms in the component (b) per silicon-bonded hydroxyl group in the component (a) was 0.099.

This molding material was transfer molded for 3 minutes at 150° C. with a molding pressure of 63 kg/cm$^2$.

The resulting molded products were very hard, had no bubbles, cracks, blisters, etc., and were excellent in quality.

EXAMPLE 5

The same molding material as the Example 1 and the same molding material as the comparative Example 3 were transfer molded into square bars of 125 mm × 6 mm × 12 mm with a molding pressure of 63 kg/cm$^2$ at 175° C. for 2 minutes. After the molding, the products were left to stand at room temperature for 1 hour, and then their dimensions were measured with a micrometer. After the products had been post cured in a hot-air oven for 6 hours at 175° C., they were left to stand for 1 hour at room temperature, and their dimensions were again measured with the micrometer.

Assuming that the dimension of the mold at room temperature was represented as $L_O$ ( = 125,00 mm) and the dimension of the products was represented as L, the degree of shrinkage was obtained according to the following equation $$\text{Shrink} = L_O - L/L \times 100\ (\%)$$

The results obtained are shown in the following Table 4.

Table 4

| | Example 1 (products of the invention) | Comparative Example 3 (commercial products) |
|---|---|---|
| Shrink (%) after molding | 0.29 | 0.33 |
| Shrink (%) after post cure | 0.31 | 0.48 |
| Change of shrink | 0.02 | 0.15 |

As will be seen from Table 4, in the case of the molded products obtained with the composition of this invention, the degrees of shrinkage after the molding and after the post cure were low and the change of shrink or the dimensional change before and after the post cure was considerably low as compared with the products obtained with the commercial composition.

We claim:

1. A thermosetting silicone resin molding composition consisting essentially of:
   (a) 100 parts by weight of an organopolysiloxane resin having the R/Si ratio of 1.0 to 1.7, R being substituted or unsubstituted univalent hydrocarbon radicals bonded to silicon atoms, and containing at least 0.2% by weight of silicon-bonded hydroxyl groups;
   (b) organohydrogenpolysiloxane containing at least one silicon-bonded hydrogen atom in each molecule thereof, said organohydrogenpolysiloxane being in such amount that the number of said silicon-bonded hydrogen atoms per silicon-bonded hydroxyl group in said organopolysiloxane of (a) is 0.001 to 0.30;
   (c) 0.01 to 15 parts by weight of organotin oxide (wherein the organic radicals are substituted or unsubstituted univalent hydrocarbon radicals); and
   (d) 50-700 parts by weight of at least one inorganic filler.

2. A thermosetting silicone resin molding composition as set forth in claim 1, wherein said hydrocarbon radicals bonded to silicon atoms in the organopolysiloxane resin of (a) are phenyl and methyl radicals.

3. A thermosetting silicone resin molding composition as set forth in claim 1, wherein the amount of said organohydrogenpolysiloxane of (b) is such that the number of the silicon-bonded hydrogen atoms is 0.01 to 0.10 per silicon-bonded hydroxyl group in the organopolysiloxane of (a).

4. A thermosetting silicone resin molding composition as set forth in claim 1, wherein the amount of said organotin oxide in (c) is 0.5 to 7 parts by weight.

5. A thermosetting silicone resin molding composition as set forth in claim 1, wherein said organotin oxide of (c) is mono-organotin oxide.

6. A thermosetting silicone resin molding composition as set forth in claim 5, wherein said monoorganotin oxide of (c) is monobutyltin oxide.

7. A thermosetting silicone resin molding composition as set forth in claim 4, wherein said organotin oxide of (c) is monoorganotin oxide.

8. A thermosetting silicone resin molding composition as set forth in claim 7, wherein said monoorganotin oxide of (c) is monobutyltin oxide.

* * * * *